2,776,930

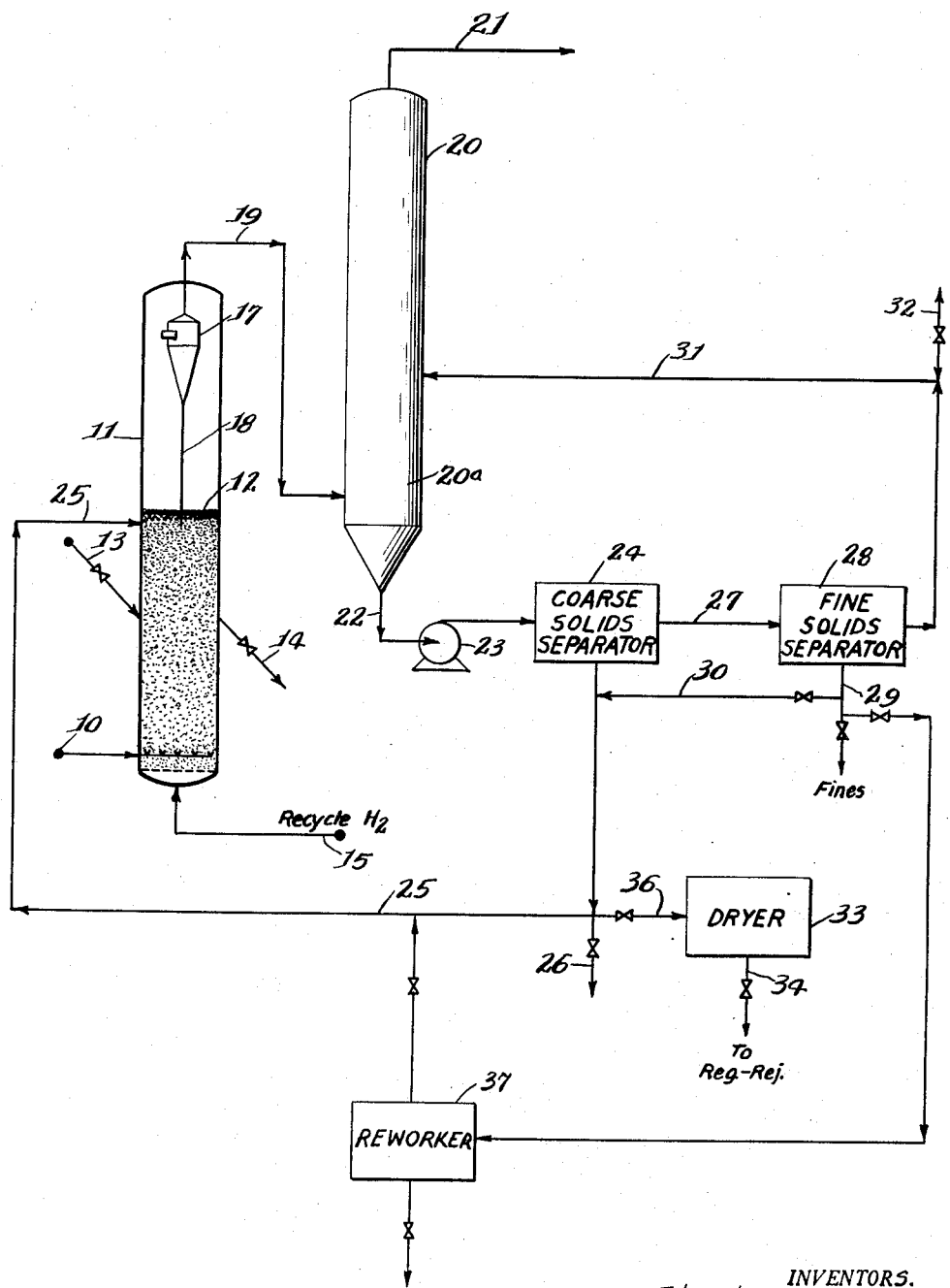

FINES RECOVERY FROM FLUID CATALYTIC CONVERSION SYSTEM

Edward D. McKeague, Crete, Ill., and Charles B. Kenyon, Chesterton, Ind., assignors to Standard Oil Company, Chicago, Ill., a corporation of Indiana Application November 23, 1953, Serial No. 393,626

6 Claims. (Cl. 196—50)

This invention relates to the recovery of fines from a fluid catalytic conversion system and it pertains more particularly to the recovery of valuable catalysts or components thereof such as platinum catalyst fines produced in a fluid hydroforming system.

In most fluid catalytic cracking systems fines are continuously vented with flue gas. The constant elimination of fines is in many cases desirable because excess fines produced by attrition must be eliminated for maintaining optimum fluidization. Also because it is desirable to add make-up catalyst at a given rate in order to maintain catalyst activity, the loss of an equivalent amount of fines is not objectionable. In some fluid catalytic conversion systems, however, there is a tendency for fines produced by attrition to accumulate in the system to the extent that proper fluidization is impaired. This is particularly true in systems wherein filters are employed instead of or in addition to conventional cyclones for preventing catalyst loss with flue gas as exemplified by the fluid hydroformer described by Seebold et al. in "Petroleum Refiner," May 1952, volume 31, No. 5, at pages 114–116. When the fluid hydroformer employs a platinum catalyst, the loss of fines becomes of even greater importance. An object of this invention is to provide an improved method and means for removing and recovering excess fines produced in a fluid hydrocarbon conversion system. An additional object of the invention is to provide an improved method and means for maintaining the desired proportion of fines in the fluidization system. Still another object of the invention is to provide a method and means for reworking only the fines and returning the reworked catalyst as a relatively coarse catalyst.

Although filters have been employed on flue gas lines as described in the Seebold et al. publication it has been customary to recover fines from the reactor effluent by scrubbing in the base of the product fractionator, the resulting slurry usually being returned to the reactor. A build-up of fines in a system of this type leads to excessive erosion of the reactor effluent line and fouling of exchangers and fractionator trays, contamination of the catalyst itself and even a carryover of catalyst with product. An object of the invention is to avoid these difficulties by an improved method of eliminating excessive fines from the fluid conversion system.

In practicing our invention we effect a separation or classification according to size of catalyst particles which are scrubbed out of the product stream in the base of the fractionator. The coarse particles which are larger than 20 microns are first separated from the slurry so that they may be recycled to the reactor or withdrawn from the unit in amounts necessary to compensate for the required catalyst make-up. After the coarse particles are separated from the slurry, the fines or particles of less than 20 microns are separated therefrom in a second catalyst separation step. Usually all of these fines are withdrawn from the system and reworked or chemically treated to recover valuable components thereof. However, in some instances it may be desirable to maintain up to about 10 percent of fines in the fluidized catalyst maintained in the unit and a sufficient amount of the fines may be returned to the system to maintain the particle size distribution which is optimum for good fluidization in the particular unit.

The invention will be more clearly understood by reference to the accompanying drawing which forms a part of this specification and which is a schematic flow diagram of that portion of a fluid hydroforming system and to which the invention relates.

A charging stock, such as a virgin naphtha boiling in the range of about 150 to 350° F. and containing substantial amounts of naphthenes but substantially free from sulfur, is vaporized, preheated and introduced by line 10 into reactor 11 at a temperature of about 850 to 1000° F. Reactor 11 contains a bed 12 of fluidized catalyst which may be molybena-on-alumina, platinum-on-alumina or any other known hydroforming catalyst. Regenerated and/or make-up catalyst may be introduced to the reactor through line 13 which diagrammatically represents catalyst introduction and, where a regenerative system is employed, catalyst may be removed from the reactor by line 14, sent to a regenerator (not shown) and returned by line 13. It should be understood that any type of reactor and any known method of catalyst introduction and removal may be employed and, since these features form no part of the present invention, they will not be described in further detail.

Hot recycled hydrogen is introduced at the base of the reactor by line 15 below distributor grid 16. The reactor is preferably maintained under a pressure of about 100 to 1000 p. s. i. g. and at a temperature in the range of 850 to 1000° F. and at weight space velocities employed in the range of about 0.5 to 10 pounds of charging stock per hour per pound of catalyst in the reactor. Entrained catalyst particles are separated from the reactor effluent by a filter or cyclone separator 17. When a cyclone separator is used, the separated catalyst is returned to the dense phase in the reactor by dip leg 18. The reactor effluent discharged through line 19 still contains considerable amounts of catalyst fines and after flowing through heat exchangers (not shown) on line 19 this stream is introduced into the fractionator 20 at a low point therein which comprises a scrubber 20a for removing all catalyst particles from the product stream. Catalyst-free product is withdrawn through line 21 for furthering processing. Thus far the described apparatus is conventional and is essentially as described in the Seebold et al. publication cited above.

In accordance with our invention the slurry which leaves the bottom scrubber section 20a of the fractionator tower 20 through line 22 was introduced by pump 23 into a coarse solids separator 24. The separator 24 may be a filter, a Dorr thickener, an ultrasonic separator, an air flotation apparatus, or any other known separating device which is effective for separating coarse solids particles which are larger than from 20 to 40 microns from fines which are 40 microns or smaller in diameter. Some fines may be carried along with the coarse particles in separator 24, but this is in some instances desirable because it is only the excessive fines which we desire to remove from the system.

The coarse particles withdrawn from the separator 24 are preferably recycled to the conversion system. This may be done by injecting the separated coarse solids by line 25 into the reactor 11 just below the upper level of the catalyst bed 12 therein. When it is desirable to remove a portion of the catalyst from the system, in addition to that represented by withdrawn fines so that the catalyst may be replaced by fresh and more active catalyst, the removal may be effected through line 26.

We also contemplate that the coarse separated catalyst may be directed by line 36 into a drier 33 wherein the slurrying liquid can be substantially completely removed from the catalyst before the catalyst is returned to the conversion system. Where the drier 33 is used, we prefer to direct the dried coarse catalyst by line 34 to the regenerator (not shown) from which regenerator the catalyst is returned to the reactor 11 by conduit means 13.

The slurry from separator 24 which now contains only catalyst fines smaller than between about 20 to 40 microns in particle size is introduced by line 27 to a second separator 28 which is preferably a filter, but may be any other known system or device for effecting solids separation from a slurrying medium. The fines are removed by line 29 so that the valuable catalyst component thereof may be recovered for reworking at 37 and so that there will be no uncontrolled build-up of fines in the conversion system. However, if it is desired to return some fines to the system, this may be done by valved line 30 which discharges into line 25 from separator 24.

The solids-free liquid from separator 28 passes by line 31 to an intermediate level in the fractionator 20 above the scrubber zone 20a for scrubbing out further amounts of catalyst fines contained in the reactor product effluent introduced by line 19. The scrubbing-slurry medium may be withdrawn or introduced to the system by a valved line 32. Likewise a cooler (not shown) may be provided on line 31 for controlling the temperature of the scrubbing medium.

When filters are employed for effecting solids separation it should be understood that a plurality of filter elements will be employed in each separator means 24 or 28 so that at least one filter element is in active service while accumulated solids are being removed from another filter element. The coarse and fine filters may be employed on the inlet side instead of the discharge side of pump 23 thereby minimizing erosion of the pump parts. Various other modifications and alternative arrangements will be obvious from the above description to those skilled in the art.

We claim:

1. The method of recovering excessive fines from a fluidized solids conversion system wherein such excessive fines are not vented with regenerator flue gas which method comprises scrubbing the effluent from a reaction zone with a liquid to produce a slurry containing catalyst particles both larger and smaller than the minimum desired particle size, separating from said slurry relatively coarse catalyst particles larger than said minimum desired particle size in a first separation zone, subsequently separating from said slurry in a second separation zone fine particles having a particle size below about 20 microns, returning at least a part of said substantially solids-free liquid from the second separation zone to the scrubbing zone reworking said separated fine particles into coarse particles, recombining a portion of said reworked fine particles with said coarse solids, and returning the recombined solids to the reaction zone.

2. The method according to claim 1 in which solids introduced into the circuit predominate in coarse solids, the smallest particle of which is larger than about 20 microns in diameter.

3. The method of claim 1 wherein between about 2 and 10% of fine particles of smaller diameter than about 40 microns is maintained in the conversion system.

4. The method of claim 1 wherein the solids contain platinum.

5. In a continuous hydroforming process conducted in the presence of finely divided fluidized platinum-containing catalyst which is cycled through a reactor and periodically subjected to regeneration and which catalyst is characterized by the progressive production of fines which tend to accumulate to an undesirable extent within the system there being no normal venting of such produced fines from the system, the improvement which comprises the steps of scrubbing effluent gases from the hydroformer reaction zone with a liquid scrubbing oil, thereby producing a slurry of solids, separating from said slurry a relatively coarse catalyst fraction and a relatively fine catalyst fraction by passing said slurry through a plurality of liquid-catalyst separation zones in series, the relatively coarse fraction comprising particles larger than about 40 microns and the relatively fine fraction containing particles smaller than about 40 microns, recombining a portion of the relatively fine fraction with said coarse fraction and returning the recombined catalyst portions to the mass of said finely divided catalyst within said reaction zone whereby the optimum proportion of relatively fine catalyst and of relatively coarse catalyst is maintained therein, diverting a portion of the recombined fine and coarse catalyst to a regeneration zone, recycling the so regenerated catalyst fraction to the reaction zone, returning the liquid scrubbing medium from the final solids separation zone to the scrubbing zone for contacting with further quantities of solids-laden effluent gases from the reaction zone, withdrawing from the system at least a portion of the relatively fine catalyst fraction, and reworking the withdrawn fine catalyst fraction for return to the reaction zone in the form of relatively coarse catalyst bodies.

6. The process according to claim 5 wherein the separated fine fraction recombined with the separated coarse fraction comprises between about 2% and 10% of catalyst particles smaller than about 40 microns.

References Cited in the file of this patent

UNITED STATES PATENTS

| | | |
|---|---|---|
| 2,421,212 | Medlin | May 27, 1947 |
| 2,447,149 | Wier | Aug. 17, 1948 |
| 2,631,968 | Peery | Mar. 17, 1953 |
| 2,642,381 | Dickinson | June 16, 1953 |
| 2,663,676 | Cardwell et al. | Dec. 22, 1953 |